US008096007B2

(12) United States Patent
Dyreby et al.

(10) Patent No.: US 8,096,007 B2

(45) Date of Patent: Jan. 17, 2012

(54) LIFTING COLUMN WITH PATIENT SUPPORT TABLE

(75) Inventors: Dick Daniel Dyreby, Silkeborg (DK); Mogens Soele Eriksen, Skanderborg (DK)

(73) Assignee: NRT-Nordisk Røntgen Teknik A/S, Hasselager (DK)

( * ) Notice: Subject to any disclaimer, the term of this patent is extended or adjusted under 35 U.S.C. 154(b) by 365 days.

(21) Appl. No.: 12/310,381

(22) PCT Filed: Aug. 24, 2007

(86) PCT No.: PCT/DK2007/000383

§ 371 (c)(1), (2), (4) Date: Apr. 6, 2009

(87) PCT Pub. No.: WO2008/022642

PCT Pub. Date: Feb. 28, 2008

(65) Prior Publication Data

US 2009/0320206 A1 Dec. 31, 2009

(30) Foreign Application Priority Data

Aug. 24, 2006 (DK) ................................ 2006 01105

(51) Int. Cl.

*A61G 7/012* (2006.01)
*B60P 1/14* (2006.01)

(52) U.S. Cl. ............ 5/611; 5/11; 108/147; 108/147.19; 254/4 R

(58) Field of Classification Search ................ 5/11, 611, 5/509.1; 254/4 R, 4 C; 108/147, 147.19

See application file for complete search history.

(56) References Cited

U.S. PATENT DOCUMENTS

| | | | | | |
|---|---|---|---|---|---|
| 2,650,371 | A | * | 9/1953 | Showalter | 5/11 |
| 3,247,528 | A | * | 4/1966 | Swenson et al. | 5/658 |
| 3,820,176 | A | * | 6/1974 | Feiertag | 5/611 |
| 5,134,731 | A | * | 8/1992 | Quintile et al. | 5/11 |
| 5,490,297 | A | * | 2/1996 | Bradcovich et al. | 5/601 |

FOREIGN PATENT DOCUMENTS

| | | |
|---|---|---|
| DE | 1906483 | 8/1970 |
| DE | 3329701 | 3/1985 |
| DE | 19749494 | 5/1999 |
| DE | 20001056 | 8/2000 |
| DE | 19920008 | 12/2000 |
| JP | 7/194662 | 8/1995 |
| WO | WO 2006/050735 | 5/2006 |

* cited by examiner

*Primary Examiner* — Michael Trettel

(74) *Attorney, Agent, or Firm* — James Creighton Wray

(57) ABSTRACT

A lifting column comprising two or more telescopically arranged column elements, where each column element comprises at least two column sub-elements arranged symmetrically on either side of a first vertical plane, one set of sub-column elements closer to the plane than the other set of sub-elements, where the outer sub-elements are slidingly connected to adjacent inner sub-elements by means of guiding sledges, and further where each column sub-element comprises at least two pulley wheels, one upper and one lower, and further where one first continuous flexible member runs from an upper pulley wheel of a first sub-element to a lower pulley wheel on an adjacent sub-element, so that the first flexible member runs on the upper or lower pulley wheels of the innermost sub-elements on either side of the vertical plane, and that the flexible member is shortened or lengthened by rolling at least one end of the flexible member around a drive wheel on a rotatable axle of an actuating motor. The invention also relates to a patient support table, comprising a patient support surface, a lifting column and a foundation structure for fastening said patient support table to a floor surface.

20 Claims, 5 Drawing Sheets

LIFTING COLUMN WITH PATIENT SUPPORT TABLE

This application claims the benefit of Danish Application No. PA 2006 01105 filed Aug. 24 2006 and PCT/DK2007/000383 filed Aug. 24, 2007, which are hereby incorporated by reference in their entirety.

FIELD OF THE INVENTION

The present invention is directed to a lifting column as well as a patient support table incorporating such lifting column.

DESCRIPTION OF THE PRIOR ART

Lifting columns are used in a number of applications such as e.g. height adjustment of table tops and particularly the present invention is directed to x-ray diagnostics tables where a patient support table comprising a lifting column are widely used.

Examples of such uses may be found in U.S. Pat. No. 4,613,121 wherein a height adjustable examination table is disclosed where the height adjustment is achieved by manipulating a number of interconnected arms so that the arms will create the necessary lifting force in order to elevate or lower the patient support surface.

Another example of such a patient support table is disclosed in DE 19636906 wherein the patient support surface is supported by two telescopically arranged lifting columns one in each end of the table so that by manipulating the two lifting columns the patient support surface may be brought into the desired elevation.

Similar systems are disclosed in US 2003/0146425, DE 20311574, U.S. Pat. No. 3,868,103 as well as a system developed and marketed by SKF of Sweden under the trade name Telemag TFG or TMS by SKF Actuation Systems Medical. Common for all these systems is the fact that the elevation is achieved by activating a linear actuator, spindle, gas spring or a hydraulic cylinder, the elements of the telescopic pillars are displaced due to activation of these means.

In WO 2004/012558 and EP 1543744 elevating systems using flexible members arranged around pulley wheels are disclosed. These constructions are rather complicated and all include a number of pulley wheels as well as multiple flexible members arranged around the pulley wheels in order to create relatively limited telescopic movements between the parts of the lifting column. A further drawback is that these systems are all designed to, by means of one pulley wheel system and a number of flexible members to elevate two columns, e.g. in connection with elevating a bed or a tabletop.

A further prior art apparatus is known from JP 07-194662, wherein is described a lift support system, constituted by three frames arranged one inside the other. The frames are internally provided with sprocket wheels around which is arranged a circulating chain. As the chain is brought to circulate, an engagement member on the outermost frame engages the chain, and is thereby elevated. The engagement member furthermore causes the inner frame members to be translated relative to each other, whereby the apparatus is elevated or lowered depending on the direction in which the chain is circulated. In order to guide and stabilise the movement between the frame members, guide rails are arranged internally, between the frames.

Within the scope of this application the terms surgery imaging room and medical room shall be understood as any room in which the type of equipment to which the invention relates, may be installed. The useful scope for the present invention may therefore not be limited by these specific terms.

SUMMARY OF THE INVENTION

It is therefore an object of the present invention to provide a lifting column wherein a simpler lifting system is provided but with added security and ease of use as well as increased inherent safety features in use. Furthermore, a patient support table including such a lifting column is provided.

These and other objects are achieved by the devices as set out in the appended claims.

DETAILED DESCRIPTION OF THE INVENTION

The invention addresses this by providing a lifting column comprising two or more telescopically arranged column elements where each column element comprises at least two column sub-elements, an inner and an outer column sub-element, where each column sub-element is arranged symmetrically on either side of a first vertical plane, with the inner set of column sub-elements closer to the plane than the outer set of sub-elements, where the outer sub-elements are slidingly connected to adjacent inner sub-elements by means of guiding sledges, and further where each column sub-element comprises at least two pulley wheels, one upper and one lower pulley wheel, and further where the flexible member is arranged symmetrically around the upper respectively lower pulleys on the sub-elements such that if the flexible member is arranged on the upper pulleys on the inner most sub-elements, the flexible member continues down to the lower pulley on that element, and from there to the upper pulley wheel on the adjacent outer sub-element, and from there down to the lower pulley wheel of that same element, before either continuing up to the upper pulley wheel on a further sub-element arranged adjacently and so forth or being led to and fixed to a drive wheel on a rotatable axle of an actuating motor, and when the flexible member is arranged symmetrically around the lower pulley wheels on the inner most sub-elements it continues up to the upper pulley wheels on the adjacent sub-elements, from where it continues down to the lower pulley wheels on the same sub-element before either continuing up to the upper pulley wheel on a further sub-element arranged adjacently and so forth or being led to and fixed to a drive wheel on a rotatable axle of an actuating motor.

The telescopically arranged sub-elements of the column elements are arranged in much the same manner as the TMS system provided by SKF Actuation Systems Medical. By arranging the pulleys and the flexible member, a synchronized movement will be effected, when the drive wheel arranged on the rotatable axle is rotated, in that the flexible member will exert the same force on the pulley wheels arranged on the sub-elements. In this manner a very stable and homogenous lifting, respectively lowering of the lifting column is achieved. The guiding sledges, which may be in the shape of a projecting rail member on one sub-element, engaging a corresponding, inverse-shaped rail on the other sub-element, provide for a very steady and stable connection between two column sub-elements. These guiding sledges have a certain vertical extent corresponding to a minimum overlap of two adjacent column sub-elements. In this aspect it is interesting to minimize the overlap so that the telescoping of one sub-element in relation to an adjacent sub-element may be as large as possible. On the other hand the guiding sledges need to have a vertical extent in order to provide lateral stability so that when an eccentric load is placed on the uppermost sub-elements, these forces, from the eccentric load, will be able to be absorbed by the guiding sledges without interferring with the proper operation of the lifting column as such.

In a further advantageous embodiment of the invention the flexible members are fixedly connected in one end to the outermost sub-element in one side, and the other end of said flexible member is connected to said drive wheel.

In this fashion a relatively slow elevation speed may be provided and at the same time the forces due to the principle of rope and pulleys may be relatively low. This in turn provides for a very smooth operation and the possibility for a user to adjust the height of the extended column relatively precisely to a desired elevation. At the same time a relatively lower rated motor can drive the actuating axle.

In a further alternative embodiment the flexible member is connected to said drive wheel in both ends, so that rotation of the drive wheel will cause the flexible member to either be shortened or lengthened.

By this arrangement the elevation speed may be increased in that in comparison to the embodiment where only one end of the flexible member is attached to the wheel, when both ends are attached to the wheel, the rotation of the wheel will cause the double length of the flexible member to be rolled or unrolled on the wheel in relation to an embodiment where only one end of the flexible members is fastened to the wheel.

A further advantage of attaching both ends of the flexible member to one wheel is the fact that a more even loading of the axle on which the drive wheels are arranged may be achieved, in that the forces from the flexible members will substantially even out so that the axle on which the drive wheel is arranged will be substantially neutrally loaded, whereas when only one end of the flexible member is fastened to the drive wheel a one-sided impact on the axle will be provided, although with half the force. The forces in question may easily be absorbed by proper mounting of the axle in power transmitting bearings.

In a still further advantageous embodiment the sub-elements have a certain width in a direction parallel to the first vertical symmetrical plane, and where a further arrangement of pulley wheels and a second flexible element is arranged symmetrically on either side of a second vertical plane perpendicular to said first plane preferably on side faces of the sub-elements, and where the two drive wheels are arranged on a common axle.

In the previous embodiments it is foreseen that a single flexible member is arranged in order to manipulate the sub-elements up and down respectively. However, for practical purposes and especially when the lifting column may be exposed to eccentric loads, it is advantageous to provide the sub-elements with a certain extent in a direction parallel to the first plane of symmetry. This is done in order to be able to provide two important aspects of the invention. Firstly, it becomes possible to provide two sets of pulley wheels and flexible members, one on either side edge of the sub-elements and secondly to provide room for guiding sledges which will be able to transfer the eccentric load to the base of the lifting column. By transferring the load and in particular bending moments created by a load, for example a patient placed on a table attached to the upper part of the lifting column, through the sledges, the flexible members are not exposed to any eccentric forces.

Starting by looking at the guiding sledges the object of these sledges is to assimilate the eccentric forces, i.e. compensate for the moment of inertia which will be created when an eccentric load is placed on e.g. a patient support bed and transferred through the lifting column to the floor. In these instances it is the object of the sledges to avoid that any eccentricity, resulting from the load and thereby an uneven force distribution, is compensated by tension in the flexible members, arranged around the pulley wheels. Therefore, the flexible members, due to the design of the sledges and the dimensioning of the sledges, shall only be exposed to a homogenous force load substantially attacking in the symmetry plane in order to distribute the forces evenly in the pulley wheels arranged on the sub-elements about the first vertical symmetrical plane. By further providing two drive wheels arranged on a common axle a completely homogenous movement of the sub-elements is achieved in that the rotational speed of the drive wheels is synchronized due to the fact that they are fastened on the same axle.

A further advantage by providing the two flexible elements is the fact that if one flexible element should fail, e.g. by breakage or the like, the other flexible element will be able to carry out the lifting/lowering of the lifting column so that continuous operation of the device is safeguarded.

In a still further advantageous embodiment of the invention an upper mounting plate is connected to the two innermost sub-elements, and where the flexible member is releasably fastened to said mounting plate between the two upper and innermost pulley wheels, and where optional means for pre-tensioning of the flexible member(s) are provided.

The mounting plate may serve to mount the patient support surface, tabletop or the like, and the underside of the mounting plate will assure that the two sub-elements are rigidly connected. Furthermore, by attaching the flexible member to the mounting plate, two or four flexible members, depending on the embodiment, i.e. whether or not one or two pulley wheel arrangements are provided as described above. This in turn will naturally create further security for a proper operation, and furthermore by creating a releasable fastening of the flexible member to the upper mounting plate, it is possible to tension the flexible elements prior to operation so that it may be assured that the same tension is induced in each flexible member. In some cases it may be advantageous to pretension the flexible members, e.g. by providing means in the shape of a load or a spring member, so that, as the flexible member is loosened from the mounting plate, the pre-tensioning means will induce the pre-tensioning force in the flexible members and thereby tighten or retighten the flexible member to a predetermined tensioning force whereby further smooth operation may be assured.

In a further advantageous embodiment the symmetry is further assured by providing a mounting so that when the first flexible member is connected in one end to the outermost sub-element in one side, and in the other end of said first flexible member is connected to a drive wheel of an actuator motor, the second flexible member is connected opposite the first flexible member.

Although the present system will be workable and fulfil its tasks by any flexible member such as e.g. ropes or drive belt, it is advantageously preferred that the flexible member is a belt, preferably a steel-wire or glass-fibre reinforced polymer based belt, optionally comprising teeth or notches on one or both surfaces of said belt.

The lifting column according to the present invention has been designed for very heavy loads. The inventive construction, using a number of pulley wheels and flexible members, will minimize the load on the construction as such as well as the requirement of power for creating the necessary lift and lowering forces. Excessive loads may damage the construction or may create a dangerous situation in cases where patients are being placed on a patient support table attached to the uppermost end of the lifting column. For theses purposes, in a further advantageous embodiment overload sensing means are provided. These sensing means may be in the shape of monitoring the power consumption of the motor driving the axle on which the drive wheels are arranged, so that peaks in the power consumption may indicate that excessive loads are present. Also tensioning means, e.g. in the shape of strain gauges mounted on the flexible members may indicate that excessive loads are present where a danger of failure is increased so that further operation should be terminated.

The invention also relates to an inventive use of such a lifting column, namely in a patient support table where the support table comprises a patient support surface, a lifting column as described above, and a foundation structure for fastening the patient support table to floor surface.

Such patient support tables are widely used for x-ray and other medical examination applications. Especially for performing x-ray investigations it is common to have a patient support table which is fastened in one end to a lifting column. This in turn provides the lifting column with a large eccentric load which within the scope of the present invention is assimilated in the guiding sledges as described above.

In further advantageous embodiments of this patient support table the support surface is fastened to the lifting column or alternatively the mounting support plate adjacent one end of said support surface, and the foundation structure includes a turntable, whereby the lifting column may be turned about a vertical axis. The provision of a turntable, e.g. proximate the floor, makes it possible to turn the patient support table away from the x-ray apparatus, MR-scanner or the like where these things are fixedly, i.e. non-movably arranged in the surgery. By being able to turn the support table away, e.g. when a patient has to be arranged on the support table, this is convenient in that the patient does not come into interference with any equipment in the x-ray examining area, as the patient support table has been turned out of the x-ray zone. It furthermore provides an operator with improved access around the patient support table for handling and preparation of the patient prior to, during and after treatment.

DESCRIPTION OF THE DRAWING

The invention will now be explained with respect to the accompanying drawing wherein FIG. 1 schematically illustrates the first embodiment of the invention.

DETAILED DESCRIPTION OF AN EMBODIMENT

Before turning to the description of preferred embodiments of the invention, the general principle of the inventive lifting column, will be described very briefly with reference to FIGS. 6 and 7.

Figure 6:
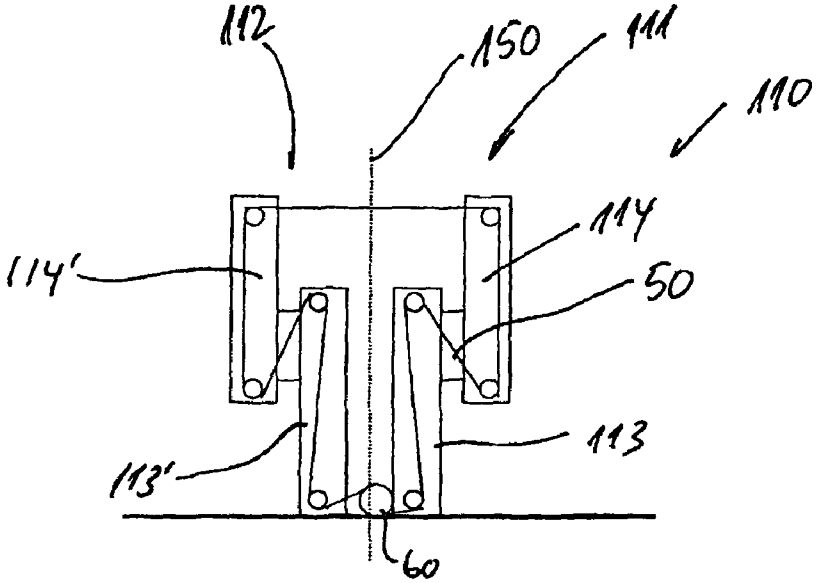
FIGS. 6 and 7 illustrate the principles of the invention in a schematic manner
Figure 7:
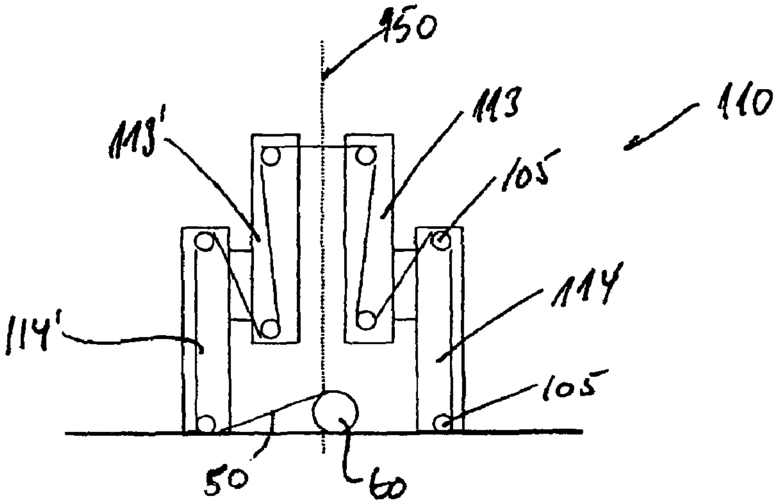

In FIGS. 6 and 7 the same principle is illustrated in two comparable constructions, such that in FIG. 6 it is the outermost sub-elements which are elevated, and in FIG. 7 it is the innermost sub-elements which are elevated.

The lifting column 110 comprises two telescopically arranged column elements 111,112. Each column element 111,112 comprises two column sub-elements 113,114,113', 114'. The column sub-elements 113,113' are denominated as inner sub-elements, and the sub-elements 114,114' are outer sub-elements.

The column elements 111,112, and thereby the column sub-elements are arranged symmetrically on either side of an imaginary vertical plane 150.

The outer sub-elements are slidingly connected to the inner sub-elements by means of guiding sledges 70, such that the sub-elements may be displaced vertically relative to each other. As, see FIG. 6, the inner sub-elements 114,114' are placed on a base or floor, the outer sub-elements 113,113' will be moveable, and vice-versa with respect to FIG. 7.

The sub-elements are further provided with pulley wheels, here denominated with the general reference 105, below however with respect to the specific embodiments further reference numbers are used.

Figure 4:
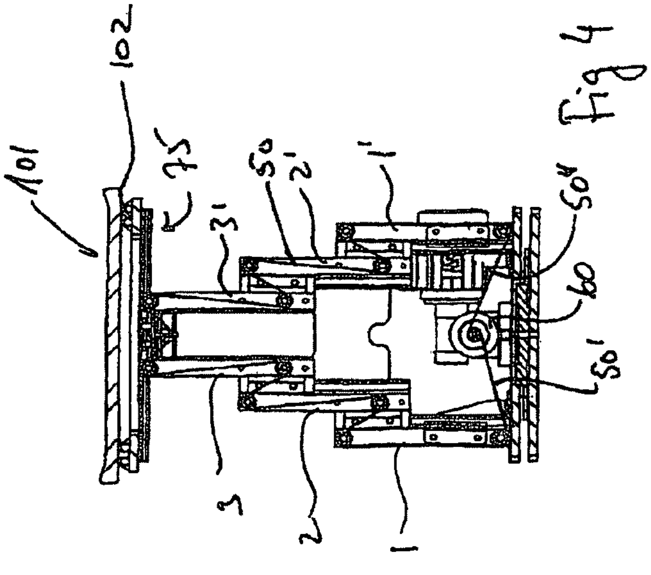
FIG. 4 illustrates a patient table incorporating a lifting column in cross-section.
Figure 5:
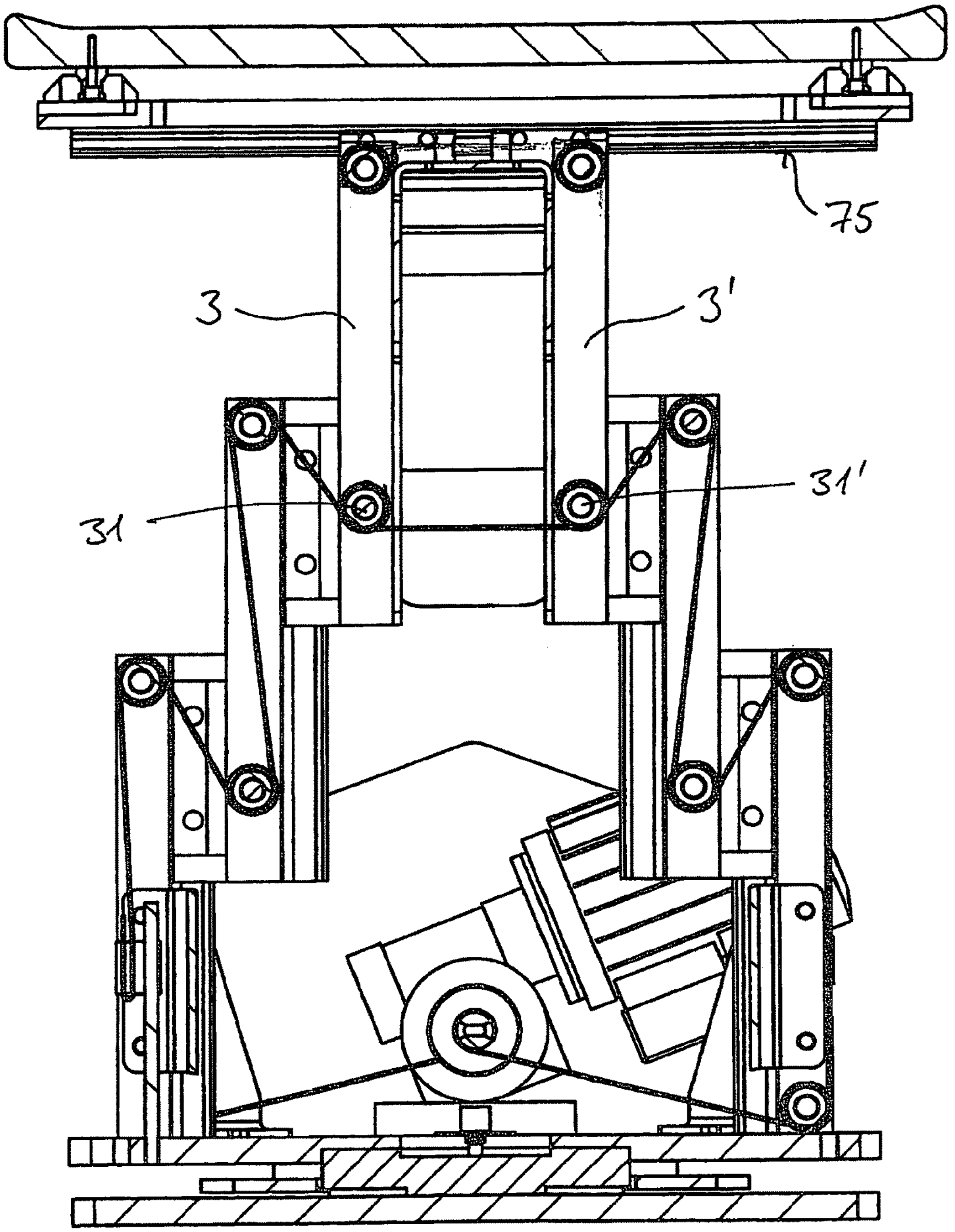
FIG. 5 illustrates an alternative embodiment of the invention.

A flexible member 50, for example a transmission belt or toothed belt, is arranged around the pulleys 105. The ends of the flexible belt 50 are either both fixed to a drive wheel 60, or one end only is fixed to the drive wheel while the other end is fixed to the base. By rotating the drive wheel 60, the flexible member will be extended or shortened. When the flexible member is shortened the sub-elements will move upwards relative to the base, whereby the lifting column as a whole will elevate the upper surface (not illustrated). With reference to FIG. 4 or 5 this means that the patient support surface 101 will be elevated relative to the floor.

By attaching both ends, a faster elevation, lowering will be achieved than by only fastening one end of the flexible member 50.

Figure 1:
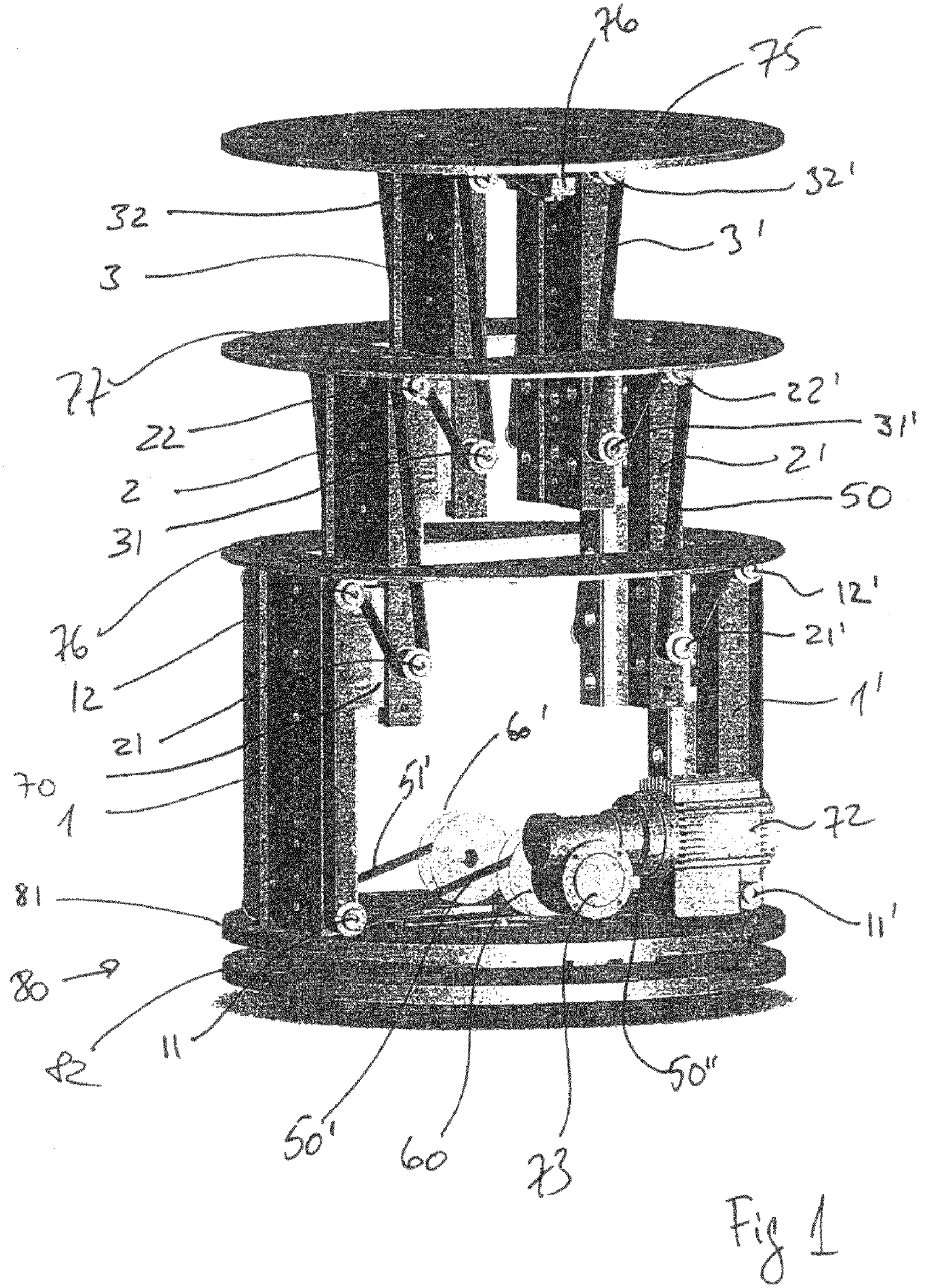

In FIG. 1 is illustrated a lifting column comprising three sets of sub-elements 1,1', 2,2', 3,3' which sub-elements are arranged symmetrically about an imaginary first vertical horizontal plane where the sub-elements 3,3' are the innermost sub-elements arranged closest to this imaginary vertical symmetry plane. On each sub-element a number of pulley wheels 11, 12, 11', 12', 21, 22, 21', 22', 31, 32, 31', 32' are provided. The pulley wheels are rotatably attached to the side faces of the sub-elements so that the pulley wheels may freely rotate about a substantially horizontal axle. In this particular embodiment pulley wheels are arranged on both side faces of the sub-elements.

Threaded around the pulley wheels is one continuous flexible member 50 which member in both ends is fastened to a drive wheel 60 so that a first end 50' of the flexible member is fastened above the axle on which the drive wheel 60 is mounted and the other end 50" is fastened below the axle on which the drive wheel 60 is mounted.

The flexible member is symmetrically threaded around the pulley wheels on either side of the imaginary first vertical symmetry plane, so that from the drive wheels 60 the flexible member 50 will rotate around the pulley 11 thereafter 12, 21, 22, 31, 32 across and through the imaginary vertical plane and return downwards by being threaded around the pulleys 32', 31', 22' 21', 12' and 11' and finally be attached below the axle of the drive wheel 60.

In the illustrated embodiment the lifting column has been almost completely elevated in that the flexible member has been wound around the drive wheel 60. Limiting the movement are the guiding sledges 70 which are provided between the sub-elements in such a manner that the sub-elements may slide vertically in relation to each other, but are firmly held against horizontal movement and twisting. The guide sledge therefore engages slidably both in the inner and outer subelements between which the guiding sledge 70 is mounted. A drive unit 72 in the shape of an electrical motor having a central rotatable axis is provided in order to power the drive wheels. The power is transferred via suitable gear box 73 through the drive axle and thereby to the drive wheels 60 so that a rotational speed of the drive wheel 60 may be achieved whereby the movement of the sub-elements in relation to each other will be carried out at a comfortable speed relating to the application into which the lifting column is applied.

In this embodiment the lifting column is furthermore provided with a mounting plate 75 rigidly fixed to the innermost sub-elements 3, 3'. On the underside of said mounting plate is provided a releasable fastening mechanism 76 so that the flexible member 50 may be fastened between the upper- and innermost pulley wheels 32, 32'. In this configuration when the flexible member 50 is fastened to the fastening device 76 the flexible member 50 will be equal to two flexible members arranged on either side of the imaginary first vertical plane. Should one of these break, the other side will, due to the fastening at 76, be able to carry out the lifting and/or lowering as decided by a user until the apparatus may be repaired.

In order to stabilize the structure and to create a support for a housing, which is not shown, each top of sub-elements may be provided with a ring 76, 77 whereby the adjacent sub-elements are rigidly supported and, at the same time a housing may be fastened to these rings.

Also, in this embodiment the lifting column has been arranged on a turntable 80 which turntable comprises an upper mounting plate 81 and a lower mounting plate 82 between which a rotational mechanism (not illustrated) is arranged so that the two plates 81, 82 may rotate in relation to each other. The lower rotation plate 82 is furthermore provided with means allowing the plate 82 to be firmly fastened to e.g. a floor. The upper rotating plate 81 comprises means for arranging the lifting column and the different components of the lifting columns. A braking mechanism is provided so that the rotation of the plate 81 relative to the plate 82 is braked by activation by the operator.

Figure 2:
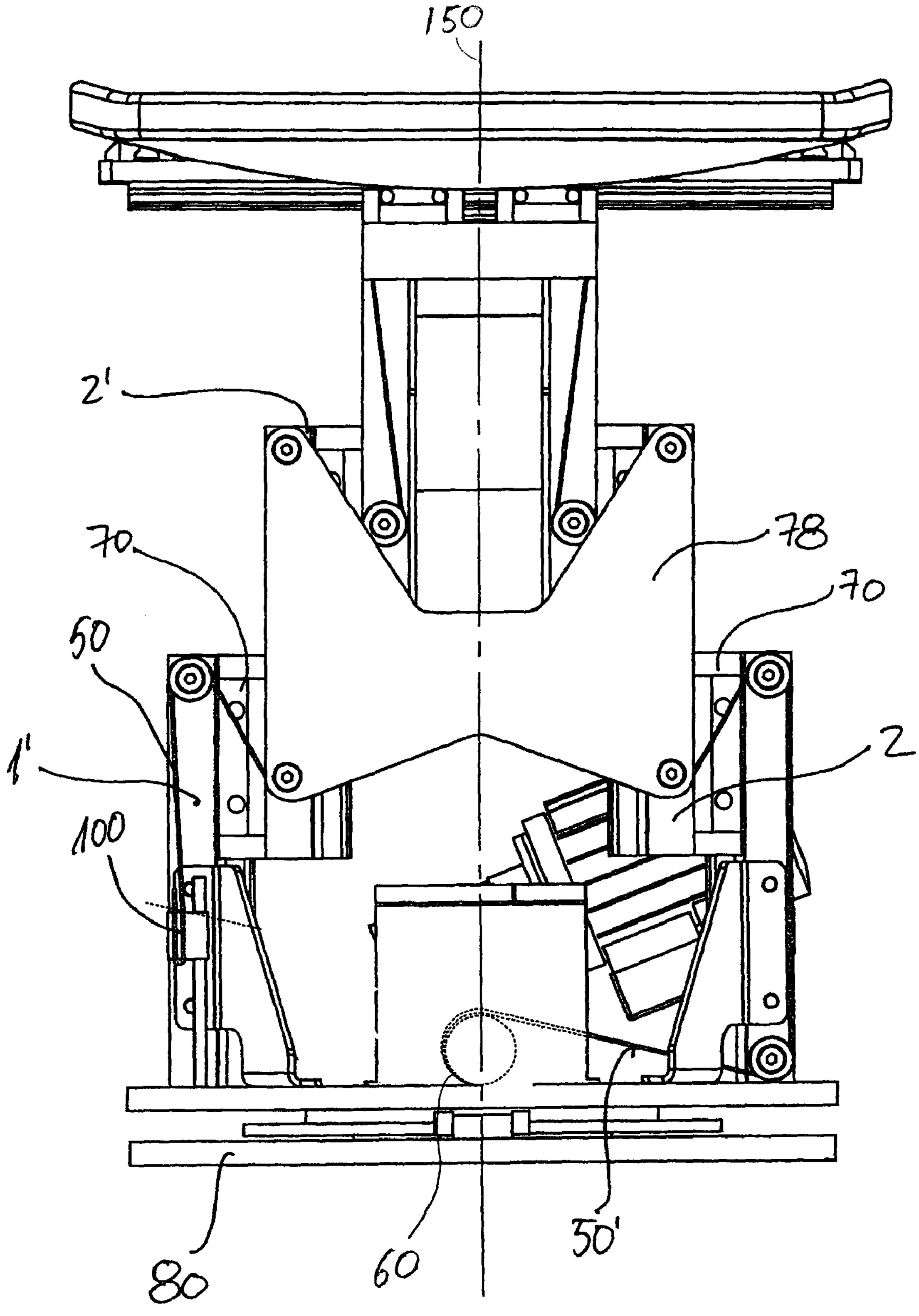
FIG. 2 schematically illustrates a second embodiment of the invention.

Turning to FIG. 2 a similar construction is provided wherein the arrangement of the flexible member 50 is different from the embodiment described with reference to FIG. 1. In this embodiment the flexible member 50 is fastened by means of a clamping mechanism 100 to a lower part of an outer sub-element 1'. The other end 50' of the flexible member 50 is attached to a driving wheel 60, so that, as the drive wheel 60 is rotated, the flexible member is wound onto or off the driving wheel, whereby the lifting column will be extended or retracted. The arrangement of the flexible member around the pulley wheels is equivalent to the arrangement described with reference to FIG. 1.

In place of the rings 76, 77, stabilizing plates 78 are arranged on either side of the intermediate sub-elements 2, 2' in order to stabilize the structure and lower the loads transferred to the guide sledges 70 arranged between adjacent sub-elements.

In this embodiment the lifting column is also arranged on a turntable corresponding to the turntable described with reference to FIG. 1.

Figure 3:
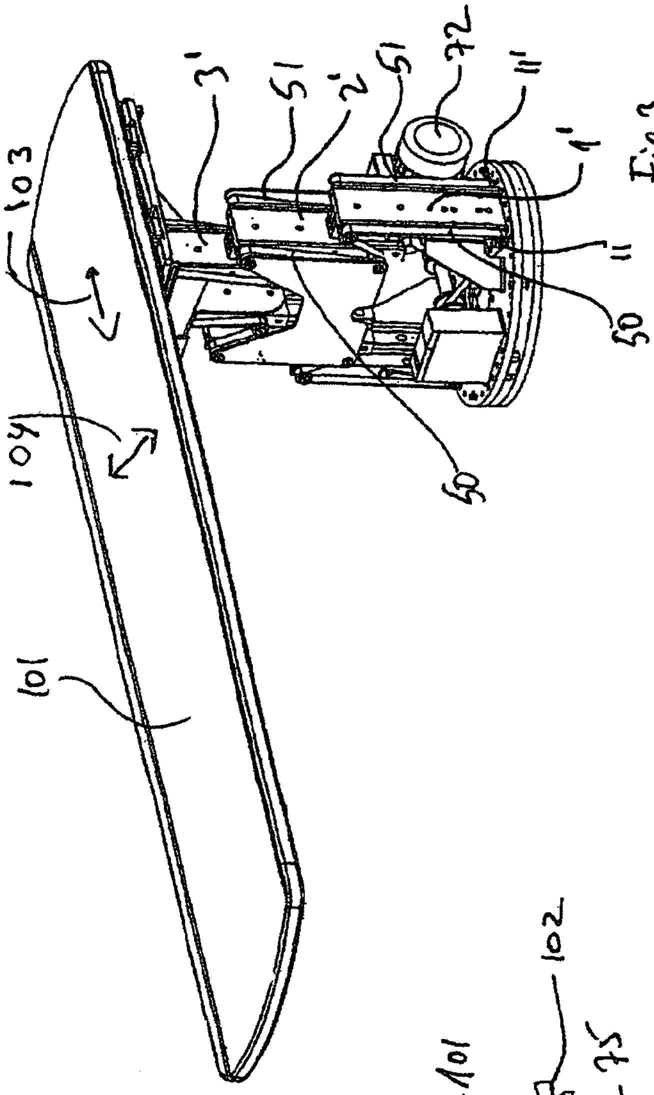
FIG. 3 illustrates a patient table incorporating a lifting column according to the invention.

In FIG. 3 is illustrated a lifting column as described with reference to FIG. 1 or 2 on which lifting column a patient support plate 101 has been mounted. As may be clearly seen in FIG. 3 the patient support plate 101 is fixed to the underlying lifting column in one end so that when a patient is placed on the patient support plate 101 an eccentric load on the lifting column arises, which eccentric load may be compensated by the guiding sledges arranged between the sub-elements 1', 2', 3' in order not to transfer excessive loads to the flexible member 50, 51. The guiding sledges therefore must be constructed so that they allow vertical movement of the sub-elements in relation to each other and is able to withstand the load, and in particular the eccentric load when a patient is placed on the patient support table 101, whereby only substantially vertical forces attacking substantially in the centre of the lifting column along a vertical axis perpendicular hereto (not shown) indicated by the arrow 104, shall be overcome by the lifting mechanism and thereby by the forces transferred to the flexible members 50, 51.

As illustrated with reference to FIG. 4 the patient support table 101 is arranged on a mounting plate 75, where the lifting column operates by rotating the axle on which the drive wheel 60 is arranged, so that the ends of the flexible member 50', 50" will be wound up or unwound from the wheel 60 whereby the sub-elements of the lifting column will move vertically, relatively to each other.

By providing bearings or sledges 102 the patient support table may be translated in a direction indicated by the arrow 103 and providing similar bearings or sledges whereby a patient placed on the support table 101 may be manoeuvred into a more optimal position in relation to the placement of e.g. the x-ray equipment. This may furthermore also lessen the eccentricity of the load placed on the patient support table 101 and thereby on the underlying lifting column structure.

In FIG. 5 is illustrated an embodiment where the flexible member 50 is guided around the lowermost pulley wheels 31,31' of the innermost sub-elements 3,3'. In this configuration it is not forseen that the flexible member may be locked between the two innermost subelements, whereas in other embodiments the flexible member may be releasably locked, for example to the mounting plate 75.

By being able to lock the flexible member to a fixed part of the lifting column it is foreseen that an even tension may be provided in the parts of the flexible members extending from the releasably lock between the to uppermost pulley wheels 32,32', see for example FIG. 1 or 4, and the drive wheel(s) 60,60'. This may be provided by applying torque to the drive wheels 60,60', and just when the sub-elements begins to move in relation to each other, the flexible member is locked, for example to the mounting plate 75. The initial torque will be substantially evenly distributed on either side of the first symmetrical plane, and thereby substantially evenly to the two halves of the flexible member.

The invention claimed is:

1. A lifting column (110) comprising two or more telescopically arranged column elements (111, 112) arranged symmetrically one on either side of a vertical imaginary plane (150), where each column element (111,112) comprises at least two column sub-elements (113, 113', 114, 114'), an inner and an outer column sub-element, where each column sub-element (113, 113' ,114, 114') is arranged symmetrically on either side of said vertical plane (150), with the inner set of column sub-elements (113,113') closer to the plane (150) than the outer set of sub-elements (114,114"), where the outer sub-elements (114,114') are slidingly connected to adjacent inner sub-elements (113,113') by means of guiding sledges (70), and further where each column sub-element comprises at least two pulley wheels (105), one upper and one lower pulley wheel, and further where a flexible member (50) is arranged symmetrically around the upper and lower pulley wheels on the sub-elements such that if the flexible member is arranged on the upper pulley wheel on the inner most sub-element the flexible member continues down to the lower pulley on that element, and from there to the upper pulley wheel on the adjacent outer sub-element, and from there down to the lower pulley wheel of that same element, before either continuing up to the upper pulley wheel on a further sub-element arranged adjacently and so forth or being led to and fixed to a drive wheel (60) on a rotatable axle of an actuating motor, and when the flexible member is arranged symmetrically around the lower pulley wheels on the inner most sub-elements, the flexible element continues up to the upper pulley wheels on the adjacent sub-elements, from where it continues down to the lower pulley wheels on the same sub-element before either continuing up to the upper pulley wheel on a further sub-element arranged adjacently and so forth or being led to and fixed to a drive wheel (60) on a rotatable axle of an actuating motor.

2. A lifting column according to claim 1 wherein said flexible member is fixedly connected in one end to the outermost sub-element in one side, and that the other end of said flexible member is connected to said drive wheel.

3. A lifting column according to claim 1 wherein said flexible member is connected to said drive wheel in both ends, so that rotation of the drive wheel will cause the flexible member to either be shortened or lengthened.

4. A lifting column according to claim 1, wherein the sub-elements have a certain width in a direction parallel to a first vertical symmetrical plane (150), and where a further arrangement of pulley wheels and a second flexible element (51) is arranged symmetrically on either side of a second vertical plane perpendicular to said first plane (150), and wherein two drive wheels are arranged on a common axle, and are connected to ends of the flexible elements (50, 51).

5. A lifting column according to claim 1, wherein an upper mounting plate is connected to the two innermost sub-elements, and where the flexible member (50) is releasably fastened to said mounting plate between the two upper and innermost pulley wheels.

6. A lifting column according to claim 4, wherein when the first flexible member (50) is connected in one end to the outermost sub-element in one side, and in the other end of said first flexible member (51) is connected to a drive wheel of an actuator motor, the second flexible member is connected opposite the first flexible member.

7. A lifting column according to claim 1, wherein the flexible member is a belt.

8. A patient support table, comprising a patient support surface, a lifting column according to claim 1 and a foundation structure for fastening said patient support table to a floor surface.

9. A patient support table according to claim 8, wherein the support surface is fastened to the lifting column adjacent one end of said support surface, and that the foundation structure includes a turntable, whereby the lifting column may be turned about a vertical axis.

10. A patient support table according to claim 8, wherein the fastening between the support surface and the lifting column comprises sliding means, where said sliding means allows the support surface to be moved substantially horizontally in the longitudinal direction of the patient support surface.

11. A patient support table according to claim 10, where said sliding means allows the support surface to be moved horizontally perpendicular to the longitudinal direction of the patient support table.

12. A lifting column according to claim 4, wherein the arrangement of pulley wheels are arranged on side surfaces of the sub-elements.

13. A lifting column according to claim 5, further comprising means for pre-tensioning the flexible member(s) are provided.

14. A lifting column according to claim 7, wherein the belt is a steel-wire or glass-fiber reinforced polymer based belt.

15. A lifting column according to claim 7, wherein the belt has teeth or notches on one or both of its surfaces.

16. A patient support table according to claim 9, wherein the fastening between the support surface and the lifting column comprises sliding means, where said sliding means allows the support surface to be moved substantially horizontally in the longitudinal direction of the patient support surface.

17. A patient support table, comprising a patient support surface, a lifting column according to claim 2 and a foundation structure for fastening said patient support table to a floor surface.

18. A patient support table, comprising a patient support surface, a lifting column according to claim 3 and a foundation structure for fastening said patient support table to a floor surface.

19. A patient support table, comprising a patient support surface, a lifting column according to claim 4 and a foundation structure for fastening said patient support table to a floor surface.

20. A patient support table, comprising a patient support surface, a lifting column according to claim 7 and a foundation structure for fastening said patient support table to a floor surface.

* * * * *